United States Patent

Fabiano, Jr.

[15] 3,637,939

[45] Jan. 25, 1972

[54] LINE STATUS CONTROL FOR ELECTRONIC KEY TELEPHONE SYSTEM

[72] Inventor: Lucian Philip Fabiano, Jr., Denver, Colo.

[73] Assignee: Bell Telephone Laboratories, Incorporated, Murray Hill, Berkeley Heights, N.J.

[22] Filed: May 7, 1970

[21] Appl. No.: 35,435

[52] U.S. Cl. ....................179/18 ES, 179/99

[51] Int. Cl. ....................H04q 3/54

[58] Field of Search ..........179/18 ES, 18 ET, 18 AD, 18 AB, 179/99

[56] References Cited

UNITED STATES PATENTS 3,519,757 7/1970 Anderson et al. ..........179/18 J

*Primary Examiner*—Kathleen H. Claffy
*Assistant Examiner*—Thomas W. Brown
*Attorney*—R. J. Guenther and James Warren Falk

[57] ABSTRACT

A key telephone system is disclosed in which switching functions are carried out in a central switching network instead of at the telephone set to reduce the amount of cabling in the system. The network is controlled by a processor associated with a memory unit containing a translation word for each station, each translation word containing the equipment location of the station and each of the lines accessible to the station. The processor employs the line equipment location to access the location in memory in which line activity need by stored only once in memory instead of repetitively in the translation word of each station having access to that line. The line activity word is protected against mistaken alteration by a phase bit.

10 Claims, 9 Drawing Figures

INVENTOR
L. P. FABIANO, JR.
BY Howard R. Popper
ATTORNEY

PATENTED JAN 25 1972 3,637,939

SHEET 3 OF 7

PROCESSOR 300 UPDATE AND DATA LOGIC

LINE STATUS CONTROL FOR ELECTRONIC KEY TELEPHONE SYSTEM

BACKGROUND OF THE INVENTION

This invention relates to electronic key telephone systems and more particularly to systems having a centralized switching network which dispenses with the need to cable line appearances directly to the station set.

The key telephone switching art is searching for a solution to the problem of excessive costs in initial installation and subsequent modification. Studies show that the first year cost of installing a new key telephone system of the conventional type is a large portion of the initial capital cost of the apparatus itself. The costs of subsequent rearrangements also consume a large percentage of the original apparatus cost per year. These labor costs are occasioned largely by the need to physically alter station wiring whenever a new line or key system service is added or dropped or when the physical location of the station set is moved.

Several different approaches have been taken to reduce or eliminate the rearrangement costs of providing key telephone systems service. In the copending application of D. J. H. Knollman, Ser. No. 726,062, filed May 2, 1968, now U.S. Pat. No. 3,549,820 issued Dec. 22, 1970 an important reduction in the amount of cabling required for each set is achieved by providing only one talking pair of conductors to a station regardless of the number of lines that the station may access. The state of the station's key button lamps and ringer is controlled by a serial data transmission from the central processor to the station over one pair of data transmission conductors. The state of the station's switchhook and key button operation dictated by the station user is forwarded via serial data transmission to a central processor over a second pair of data conductors. Rewiring at the station set is completely eliminated because the function desired for each key button is assigned in the central memory associated with the processor rather than by cross connections at the telephone set. Other improvements in the key telephone system art are disclosed in the copending application of H. P. Anderson—M. A. Flavin—J. P. Grandmaison—G. E. Saltus—J. L. Simon, Ser. No. 709,585 filed Feb. 27, 1968 now U.S. Pat. No. 3,519,757 issued July 7, 1970, and in the application of D. C. Opferman, Ser. No. 844,913, filed July 25, 1969.

While all of the foregoing systems make important contributions to reducing the need for system wiring changes, the commercial acceptability of an electronic key telephone system will be enhanced by simplifying the requirements placed on the central processor and its associated central memory unit.

One of the characteristics which distinguishes the switching function required to be performed in a key telephone system with that performed in a PBX or in a central office is that bridging, or the connection of a line to two stations, is a service objective in key systems, whereas it is largely sought to be avoided in PBX and central office systems. The close community of interest which exists among stations of a key telephone system assigned to a particular telephone customer dictates that quite frequently two stations will desire to have access to the same central office PBX or tie line. Such multiple station bridging is, of course, strictly avoided in central office switching systems and when this service is required special conference circuits employing multiport hybrid apparatus must be employed.

In the prior art, the possibility of multistation access to a given telephone line is met simply by physically wiring that line to a particular key button on each telephone set that may desire its access. Each station having such a key button may bridge on the line merely by operating the button. As mentioned before, however, physically wiring the line to the station is a costly luxury and when the station is to be given access to many lines, the luxury is diluted by the need to have multiconductor cable brought out to the station set.

In an electronic key system having a central processor and a central memory unit which stores the assignment of lines to stations as in the above-mentioned D. J. H. Knollman application, the need for such cabling at the station is eliminated. However, the memory unit of such a system, in addition to storing the assignment of lines to stations must also store an indication of the activity state of each of the lines whether busy or idle, ringing, etc. This representation of such activity states requires five or more bits. If these bits representing the activity states of multiaccessible lines are to be stored as a byte in the memory word for each station, the redundancy thereby introduced will decrease the efficiency of memory utilization. Moreover, because a plurality of stations may have control of the same line it would be difficult for the processor at any given time to decide what updating data should be transmitted to any of these stations for changing the illumination of one of its key button lamps, inasmuch as some kinds of line activity such as line idle cannot be completely ascertained until all stations having control of that line have been accessed. Similarly, the line's status would be recorded differently in each station's memory word and it would be difficult for the processor to decide which status to employ.

Accordingly, it is desired to provide a key telephone switching system which contains a centrally located switching network, processor and memory unit in which system complexity and particularly memory redundancy is effectively reduced.

STATEMENT OF THE INVENTION

In accordance with my invention, an electronic key telephone system is provided containing a central processor for controlling a switching network in which each of the lines and key telephone stations may be interconnected by key button operation. The assignment of lines to stations is provided for by a translation word in memory for each station. The translation word includes a byte containing the equipment location of the station and of each line to which the station is to be given key button access. The line equipment location and the station equipment location will identify to the processor the location of the line and station respectively in the switching network. For each translation word read from memory there is a corresponding station activity word read. This activity word indicates the activity of the station associated with the translation word. In addition, for memory will contain one (and only one) activity word FOR each line. The central processor will sequentially access the station translation words and their corresponding station activity words. The line equipment location byte for each line accessible to the station whose translation word has been accessed will in turn be employed as an address to access the single activity word for that line. The activity words will be updated as the central processor receives data from the stations. When a station indicates that it is placing a line in an active state, the activity word for that line will be updated. However, when the station indicates that it is placing the line in the inactive state, the activity word for that line will not be changed until all of the stations having access to that line have likewise indicated that the line may be rendered inactive.

In accordance with one aspect of my invention, the processor uses a two-stage counter to define three system phases: phase one, two and three. This phase counter is incremented each time the processor completes one processing cycle (i.e., each time all the stations have been processed). As lines are processed during phase one, their respective phase bits are reset by the processor logic. At the end of this processing cycle, the phase counter is advanced to phase two. During phase two all lines which have stations using them have their respective phase bits set. At the end of this phase the phase counter is again advanced. During phase three, and as all lines are processed, those which have their line activity phase bits reset will have their corresponding line activities cleared to idle. At the end of phase three the phase counter is reset to phase one and the process repeats.

My invention may advantageously be employed in the electronic key telephone system disclosed in Fabiano-Grandmaison-GreasongKing application, Ser. No. 35,434, filed on even date herewith. However, my invention is not to be deemed as limited to such a system.

DESCRIPTION OF THE DRAWING

The foregoing and other objects and features may become more apparent in the light of the ensuing description when read together with the drawing, in which.

GENERAL DESCRIPTION

Figure 1:
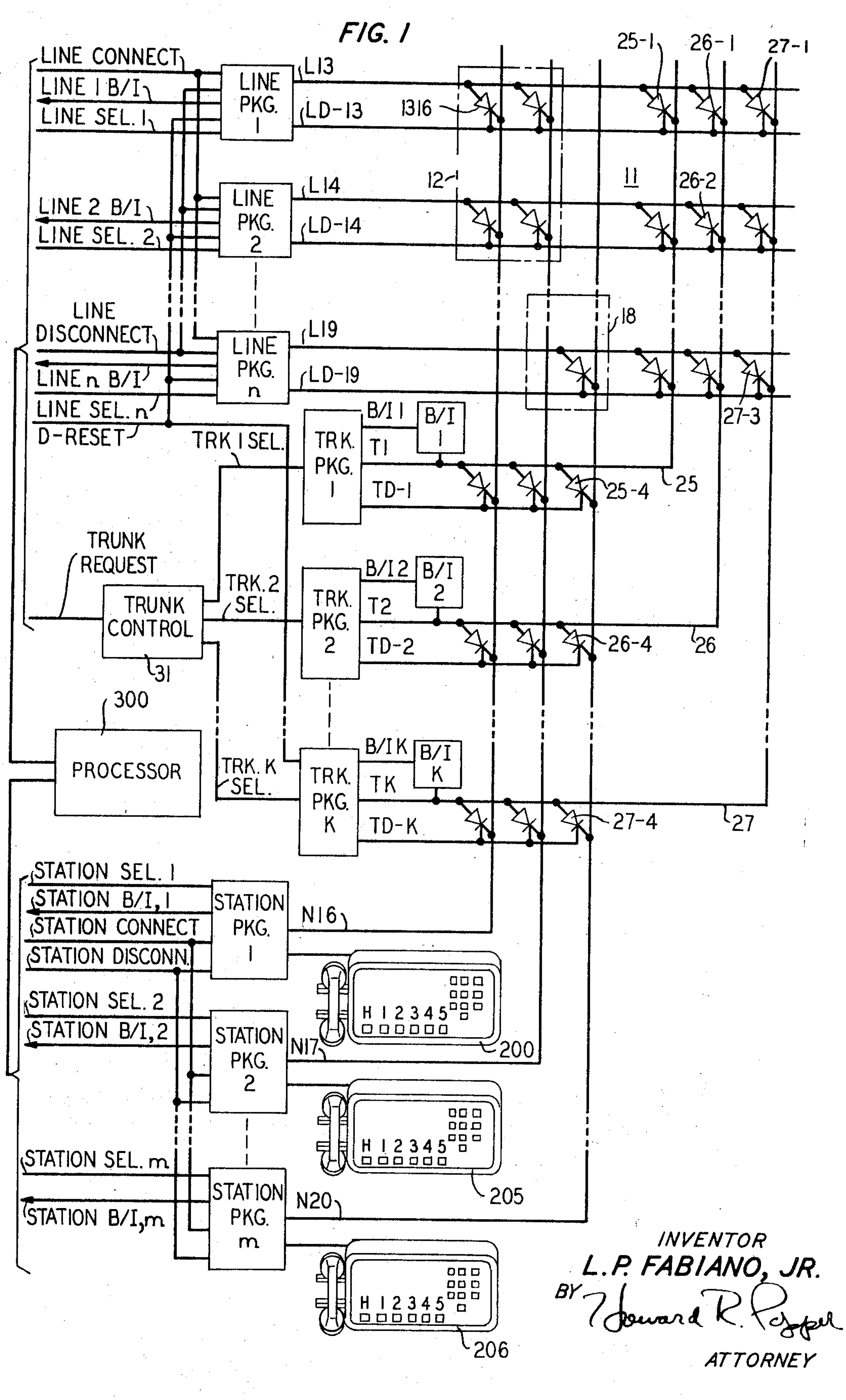
FIG. 1 shows a block diagram of an electronic key telephone system arrangement according to the above mentioned Fabiano et al. application and in which my invention may be incorporated.

Referring now to FIG. 1, there is shown a simplified schematic representation of the key telephone switching system of the above-identified Fabiano et al. application and in which my present invention may be incorporated. The arrangement comprises a switching network 11 containing semiconductor cross-points which advantageously may be of thyristors of shorted-emitter design in which there is present, effectively, a resistor from the gate element to the emitter element to improve controllability of the device parameters. A more complete discussion of such devices, which are a variety of PNPN triodes, may be found in F. E. Gentry, *Semiconductor Controlled Rectifiers*, Prentice Hall, 1964 at page 138 et seq.

Monolithic, integrated arrays of thyristor cross-points may be coupled on ceramic substrates to obtain a unit building block array of any desired dimension. In network 11, one such group of cross-points is depicted at 12 and provides for establishing interconnections between line L13 associated with line package 1 and conductor N16 associated with station package 1 serving station set 200. Also, line L14 associated with line package 2 may be connected through a cross-point of group 12 with conductor N17 associated with station package 2 serving station set 205.

For simplicity, only a representative number of telephone lines, stations and cross-points in network 11 have been shown. While the lines L13 and L14 may be connected to station sets 200 and 205 through different combinations of the direct cross-points in substrate group 12, there will be some lines and stations for which no direct cross-point is available in network 11. In FIG. 1, for example, telephone stations 200, 205, and 206 may be thought of as belonging to one telephone customer. Stations 200 and 205 will have nonblocking access to lines L13 and L14 via cross-point substrate group 12. Station 206 will have nonblocking access to line L19 via cross-point substrate group 18. However, stations 200 and 205 are not provided with any direct cross-point in network 11 for communicating with line L19. However, since these stations belong to the same customer, the need may arise for at least one of them to be given access to line L19. Similarly, lines L13 and L14 may desire to communicate with station 206 for which no direct cross-point path is provided.

While, theoretically, a direct thyristor cross-point could be especially provided to interconnect these last-mentioned lines and stations on a custom installation basis, it is deemed inefficient to tamper with the substrates constituting network 11. Further, it is desired that network 11 contain a plurality of cross-point substrates arranged along a principal diagonal of the network where each such substrate group such as 12 and 18 provides for interconnecting among a particular group of lines and stations. Accordingly, once the assignment of such substrates 12 and 18 has initially been made as, for example, among consecutively numbered groups of lines and stations, no cross-point is available to effect a connection between one of these stations and a nonconsecutively numbered line that may be associated with a different cross-point substrate group. However, as described in the above-mentioned copending application of Fabiano et al., network 11 is equipped with a limited number of two-stage cross-point trunk paths 25, 26, and 27. To connect line L13, for example, to station 206 for which cross-point substrate group 12 provides no direct path, one of the thyristors 25–1, 26–1 or 27–1 at the intersection of any of trunk paths 25, 26, and 27 with line L13 may be fired together with one of the companion thyristors 25–4, 26–4 or 27–4 at the intersection of the last-mentioned paths with conductor N20 associated with station 206. Similarly, if line 14 required access to station 206, the connection might be effected by means of thyristors 26–2 and 26–4 of trunk path 26.

Ordinarily, the control of the cross-points of a switching network such as network 11 by a call processing apparatus would necessitate that the memory unit of such apparatus contain status information concerning which lines were directly connectable to which stations and status information concerning which of trunk paths 25, 26 or 27 was available to be used in the event that a direct connection path was not provided by means of one of the cross-point substrate groups such as 12 or 18. The first of these items of stored information is commonly referred to as a network map and the second would be called the busy-idle record for such trunk circuit paths. In accordance with the invention described in the above-mentioned copending application of L. P. Fabiano et al. filed of even date herewith, however, neither such a network map of available direct cross-points nor a busy-idle record of alternate trunk paths need be stored in memory. The logic circuitry of central processor 300 shown in FIG. 2A and more particularly in FIG. 3, when instructed to effect an interconnection between a line and a station, will apply a line connect and a line select signal to the line package of the designated line such as line package 1 for L13 and a station select and station connect signal to the station package of the designated station such as station package 1 for station set 200. If a cross-point is in fact provided in network 11, the cross-point will fire and the station package mark monitor will cause a signal indicating success to be sent back to processor 300, as discussed below. However, if no direct cross-point exists in network 11, the mark monitor signal will be absent. When, under these circumstances, the mark monitor signal is not provided by the station package, processor 300 applies a signal on the trunk request lead to trunk control circuit 31. Trunk control circuit 31 selects one of trunk packages 1 through K and if the selected trunk package is available (i.e., idle), a path will be completed through the associated one of trunk paths 25, 26, or 27.

DETAILED DESCRIPTION FIGS. 2A–2B

Figure 2A:
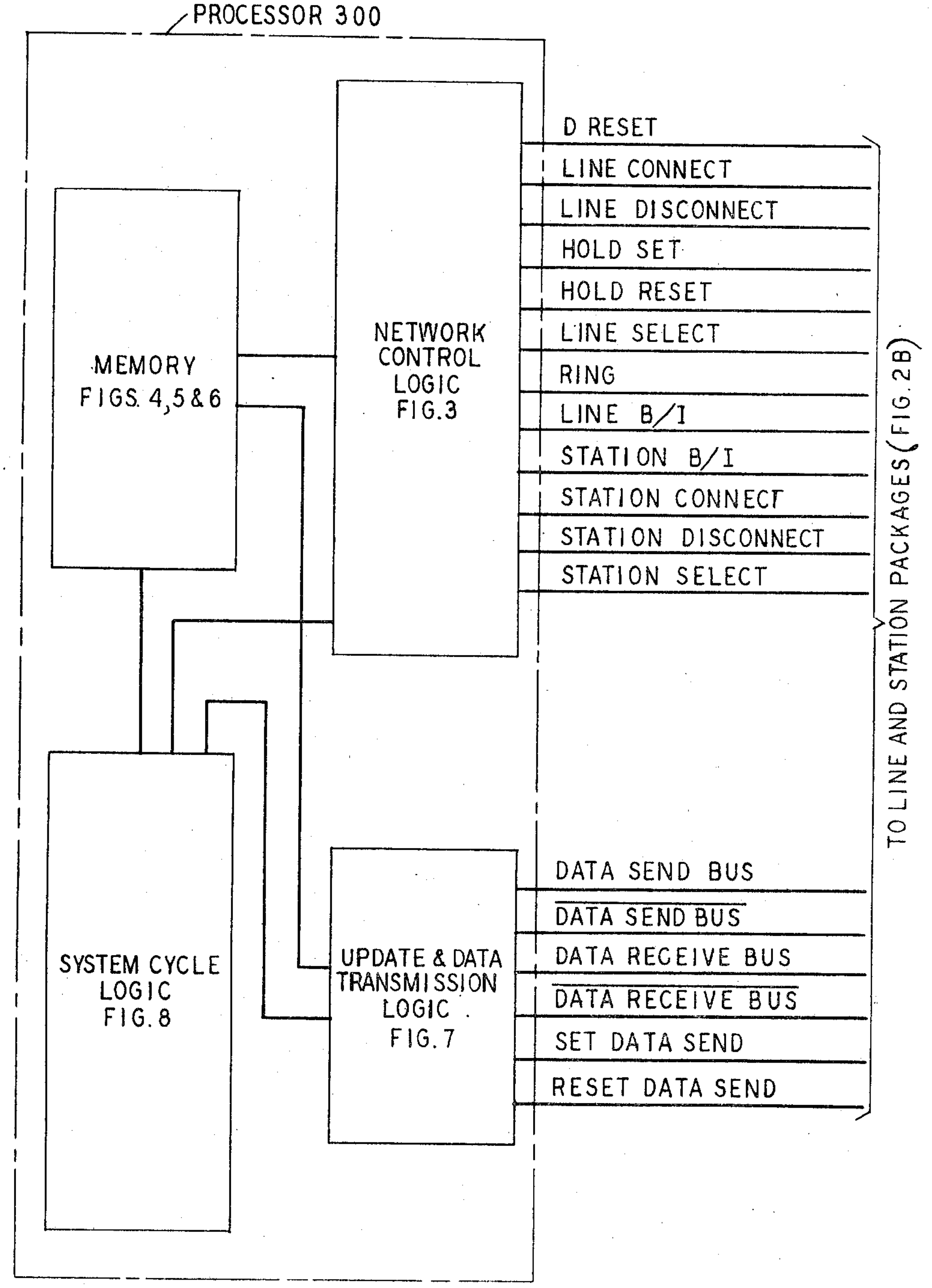
FIG. 2A shows a block diagram of the central processor of the arrangement of FIG. 1.
Figure 2B:
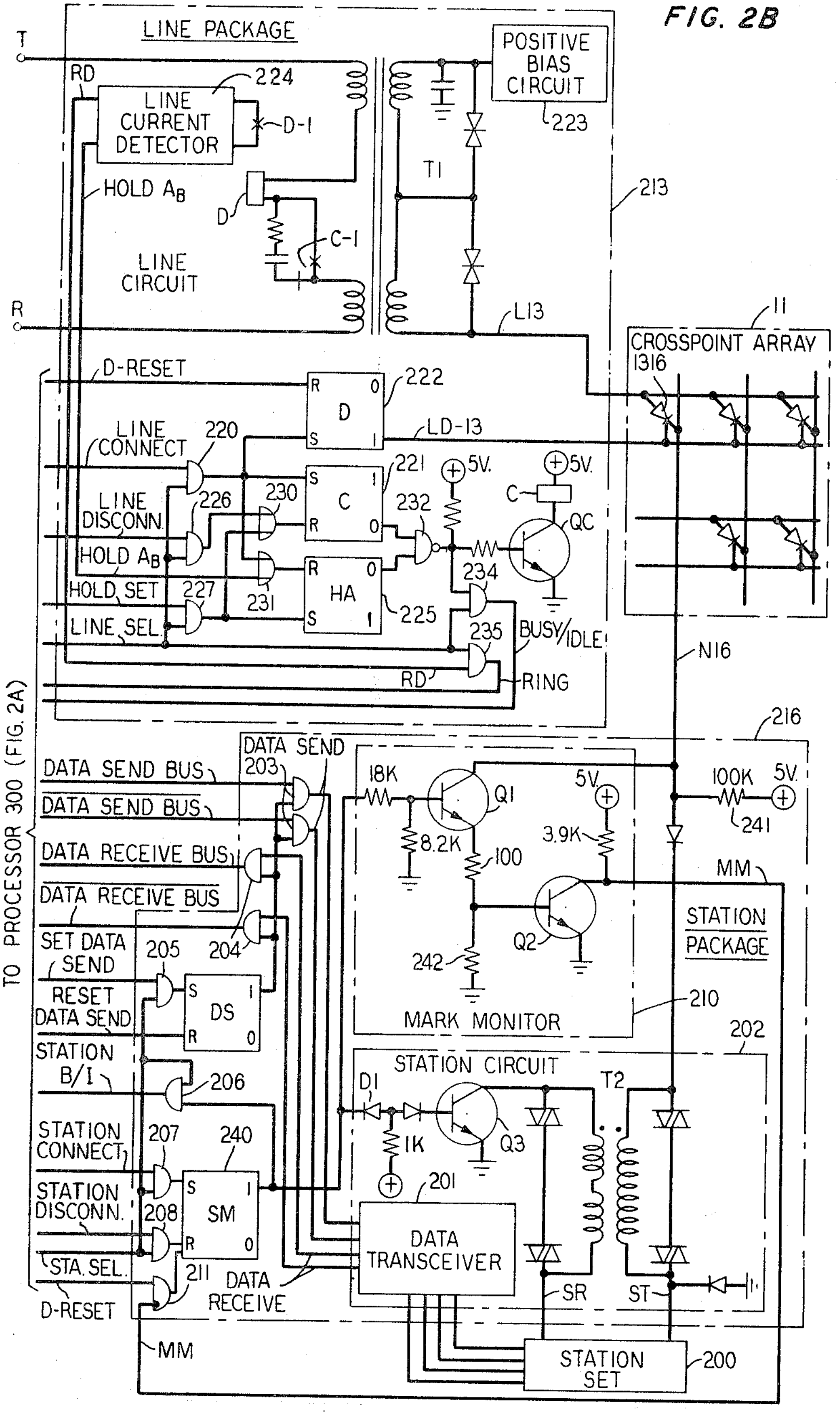
FIG. 2B shows details of an illustrative line package, station package, and network connection in the arrangement of FIG. 1.

The details of an illustrative one of line packages 1–*n* of FIG. 1 and of an illustrative one of the station packages 1–*m* of FIG. 1 are shown in FIG. 2B at 213 and 216, respectively. In addition, an illustrative station set 200 is shown at the bottom of the figure connected to station package 216. Each such station set is provided with three pairs of leads as in the above-mentioned copending Knollman application. A pair of data input leads and a pair of data output leads connect the station set 200 with a data transceiver 201 in the station circuit portion of the station package 216. The tip and ring talking path leads SR, ST connect the station set to the windings of transformer T2. Only one of the talking conductors, however, N16 is provided with an appearance in network 11.

The station set contains an encoder, not shown, by means of which a coded representation of the identity of any key button operated by the station user is transmitted over to the processor (FIG. 2A) over the data leads via data transceiver 201. Station set 200 also contains a transceiver circuit and register, not shown, by means of which information provided by the processor is converted into signals for illuminating the key buttons at a specific rate as determined by the processor 300 and for operating the station ringer, not shown. As has priorly been described in the above-mentioned copending applications, the transmission of data to and from the station set may be carried on in synchronous fashion, each bit incoming to the set causing a bit of information to be shifted out of the set. The remaining elements in station package 216 will be described later in connection with the description of processor 300 operation.

The illustrative line package 213 comprises a line transformer T1 having its primary windings connected to the tip and ring conductors of a line that may be connected to a central office or PBX. The secondary windings of transformer T1 are connected between a positive bias circuit 223 and a talking appearance lead L13 which the line package presents to cross-point array 11. The primary side of the line package includes a line relay D whose winding is connected to monitor the loop current to the remote office. Relay D responds to the presence or absence of loop current and also to the application of ringing current by the remote office. Contact D–1 of relay D signals the various loop circuit conditions to line current detector 224. Line current detector 224 provides at its output leads RD and $HOLDA_B$ indications that are compatible to the type of signals acceptable to processor 300. These signals will be discussed in detail later.

Line package 213 also contains D flip-flop 222, C flip-flop 221, and HA flip-flop 225. C flip-flop 221 is set when a line connect signal and a line select signal is applied by the network logic FIG. 2A of processor 300. When C flip-flop 221 is set, a low signal appears at its "0" output. Simultaneously, with the setting of C flip-flop 221, the line connect and line select signals which activate AND-gate 220 will cause HA flip-flop 225 to be reset via OR-gate 231. With C flip-flop 221 set and HA flip-flop 225 reset, NAND-gate 232 will have its upper input lead in the low-signal condition and its lower input lead in the high-signal condition causing its output connected to the base of transistor QC to go high. Transistor QC turns on operating relay C. Relay C in operating at its contact C–1 provides a DC bridge to the remote office at the primary of transformer T1. Simultaneously, with the setting of C flip-flop 221, D flip-flop 222 is set. Setting of D flip-flop 222 provides a ground signal on lead LD-13 thereby enabling the gate electrodes of the row of thyristor cross-points in network 11 associated with the line L13. Positive bias circuit 223 is in series with secondary winding of transformer T1 connected to line L13. When the gate electrodes of the aforementioned row are activated by the ground signal on lead LD-13 and as hereinafter described, a current sink is provided to one of the cross-points by a station package such as station package 216. A talking path connection is established between the line package and the station package through an activated cross-point such as cross-point 1,316. In the normal operation of processor 300, a D reset pulse is now applied resetting the D flip-flop and removing the enabling pulse from lead LD-13.

When processor 300 determines that the network connection between a line and station package is to be broken, it activates the line disconnect lead and the line select lead thereby activating AND-gate 226. AND-gate 226 activated resets C flip-flop 221 through OR-gate 230. Resetting of C flip-flop 221 causes a high signal now to be applied also to the upper input of NAND-gate 232 thereby causing its output which is applied to the base of transistor QC to go low. Transistor QC turns off releasing relay C.

When processor 300 determines that line package 213 is to be placed in the holding condition, it activates the hold set and line select leads thereby activating AND-gate 227. AND-gate 227 sets HA flip-flop 225 and resets C flip-flop 221 through OR-gate 230. Resetting of HA flip-flop 225 causes a high signal to appear at its "0" output which is connected to the lower input of NAND-gate 225. The resetting of C flip-flop 221 provides a high signal at its "0" output which is connected to the upper input of NAND-gate 232. Accordingly, the output of NAND-gate 232 is in the high-signal condition maintaining transistor QC on and relay C operating. Should the remote office connected to the primary winding of transformer T1 now abandon the call, relay D will release and line current detector 224 detecting this release will apply a signal to lead $HOLDA_B$. The signal on this lead resets HA flip-flop 225 through OR-gate 231. HA flip-flop 225 in the reset condition produces a high signal at its "0" output connected to the lower input of NAND-gate 232. At this time, NAND-gate 232 has high signals applied to both of its inputs because C flip-flop 221 and HA flip-flop 225 are both reset. The output of NAND-gate 232 now exhibits the low-signal condition causing transistor QC to turn off and to release relay C. Relay C released at its contact C-1 removes the DC connection to the remote office.

In the ensuing description which is concerned with the operations of logic circuit 300, the processor will from time to time be described as "accessing" the line package or station package. When the processor accesses a line package or a station package, it always energizes the line select or station select lead as the case may be. In addition it may activate one of the foregoing line connect, line disconnect or hold set leads or a station connect or a station disconnect lead. In addition the processor will also access the line or station package to ascertain the status of that package. For example, during one phase of its system cycle operation, processor 300 will desire to ascertain the state of line package 213. In one of these circumstances, the line select lead is energized and the C relay is operated or released as has just been described. The state of this relay will be revealed to the processor by signals appearing on the busy/idle lead at the output of AND-gate 234. Simultaneously if the remote office has applied ringing to the primary winding of transformer T1, the RD lead at the output of line current detector 224 will enable AND-gate 235 whose output will reflect the appropriate condition to processor 300 on lead RING.

At this point, it will be helpful to consider the manner in which information is exchanged between central processor 300 and its memory unit. The memory unit comprises a read-only portion containing a translation word, FIG. 4 for every station in the system and a changeable portion containing a station activity word, FIG. 5, for each station and a line activity word, FIG. 6, for every line in the system. The station activity section of memory is used as a scratch store. A station activity word is read from memory each time a translation word is read, and is associated with the corresponding station. Each word is composed of three bytes which define the past history of the station set. The first byte 5–1 labeled Active Line Button indicates the current active line button being used. The second byte 5–2 labeled Active State Button indicates the present active-state button, and the last byte 5–3 labeled Last Received Button indicates the last button state received from the station set for its button groups. It should be noted that the current active line button and the present active-state button are not necessarily the same. This is because the present active-state button may correspond to a service button being applied to the station set's active line. The third byte 5–3 is used to insure that at least two successive identical button states are received before any service actions are performed, and to increase data transmission reliability.

The array of line activity words is called the primary line store. In general, each station set will have buttons for accessing more than one telephone line and the same line may be accessible to more than one station. It would therefore be inefficient to store in each station's memory word the status of every line that the station could access because the line status information would then be repeated in each station's memory word having access to that line. In accordance with my invention, the activity of the telephone line is stored just once in memory in the line activity word, FIG. 6, and the line bytes in each station's translation word, FIG. 4, are consulted to obtain the address of the line activity word.

Figure 4:
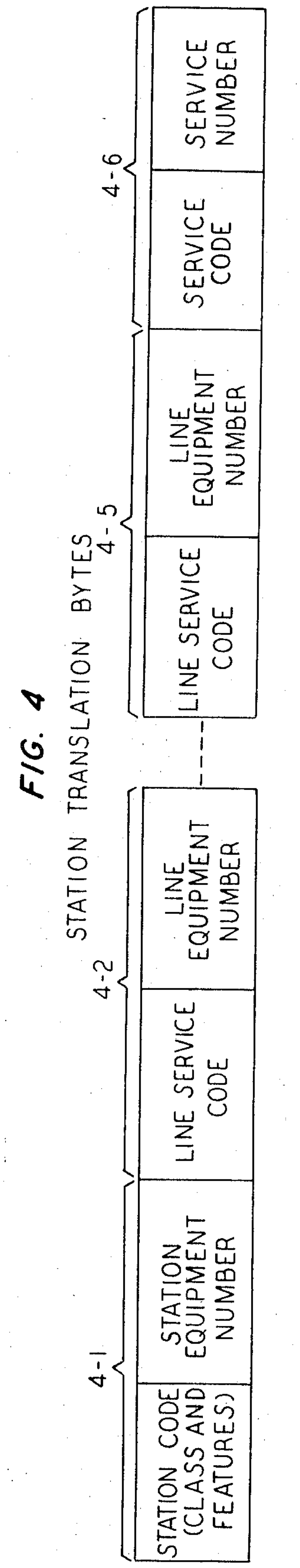
FIG. 4, 5, and 6 show respectively the station translation, the station activity, and the line activity portions of the processor's memory unit utilized in this embodiment of my invention.

Assuming that telephone set 200 contains six key buttons which includes one hold button and five key buttons, the station translation word, FIG. 4, will comprise six information bytes. The station byte 4–1 of the station translation word contains the station code and the station equipment number. The station code is a sequence of binary bits which identifies the type of station, i.e., whether the station is a six-button key telephone set, whether it has "I-HOLD" service or any of the other well-known types of station services that customers of key telephone systems find desirable. The station equipment number designates the location of the station's talking path lead N16 in cross-point array 11 and identifies to the processor the location of the station package station select lead and transceiver leads.

The five remaining bytes in the station translation word, FIG. 4, each contain two segments and may be line button information bytes or service button information bytes. For a line button information byte, the first segment gives the line service number for the particular line and the second segment gives the line equipment number for that line. The line service number is a coded designation of bits which indicates to the processor the type of line (intercom, delayed ring, normal ring, no ring, etc.). The line equipment number designates the location of the line's appearance in network 11 and also identifies to the processor the location of the line package. On the other hand, for a service button information byte the first segment identifies the particular key button service such as buzzing, exclusion, etc., while the second segment containing the service number is used to carry out the service.

Physically, the station translation words may be arranged in a memory fabricated of multiple diode integrated circuit chips arranged on a printed circuit board, not shown. Each diode in such a memory corresponds to a bit position and the bit could be a "1" or "0" as occasioned by the presence or absence of a dot of conducting paint which connects or leaves unconnected the particular diode in the array. In this manner, the translation memory may constitute a read-only device that can be changed in the field by maintenance personnel. Changes in the assignment of lines that a given station may access or in the services to be accorded a station may thus be changed by altering the diode connections in the station translation memory instead of vast cross connect fields required in prior art key telephone systems.

PROCESSOR UPDATE AND DATA LOGIC FIG. 7

The station translation word, FIG. 4, for each station in the system is sequentially accessed by central processor 300 logic 7–1. Assume that logic 7–1 reads the station translation word for station 200. The station code and station equipment number are read out and stored in a temporary register, not shown, in the central processor. At the same time, the station activity word (FIG. 5) associated with the station is read from memory and the information therein is transferred to another processor register, not shown. Next, processor logic 7–2 transfers the contents of the first line button or service button byte in the station translation word to another of its internal processing registers, also not shown. The first button on a key button telephone set is normally a hold button for which no translation information is required in memory. Accordingly, the first byte selected by logic 7–2 will correspond normally to the second key button on the station set.

Figure 5:
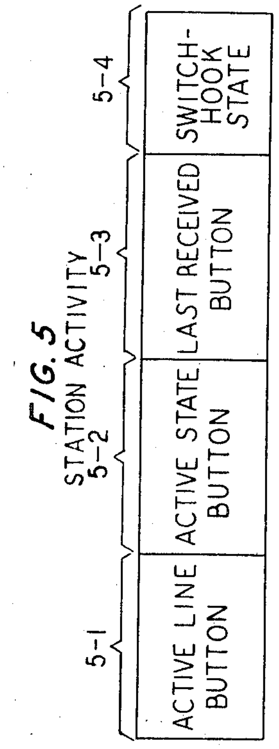
Figure 6:
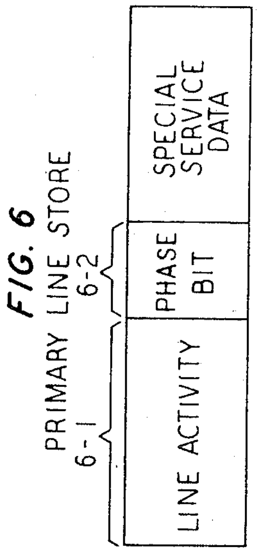

Assuming that, as shown in FIG. 5, the selected byte is line button information byte 4–2 (which corresponds to line L13 associated with line package 213) the line equipment number stored in this byte will be used by logic 7–3 as an address to access the location in the primary line store, FIG. 6, containing the activity word for line L13. Simultaneously, the line equipment number is used by logic 7–3 to access line package 213.

With the information pertaining to the state of station 200 and of the line corresponding to the first line button of that station registered in a temporary register internal to processor 300, logic circuit 7–4 in the processor can now determine what lamp and ring data should be generated for this line. Let it be assumed, for example, that key button 2, the first line button on station 200, which key button pertains to line L13, is presently "picked up" at station 200 and that the line is in the talking condition. Logic circuitry 7–4 determines that the lamp information for key button 2 at station 200 should cause the lamp under the key button to be illuminated at a rate indicative of the talking condition. A lamp bit corresponding to this data is generated by the logic circuitry and stored in a processor output register, not shown, to be subsequently transmitted to station package 216.

On the other hand, had the information in the line activity word indicated that line L13 was idle but the information obtained by sampling line package 213 now indicates that the line is ringing, logic circuitry 7–4 updates the line activity word, FIG. 5, and generates lamp-and-ring information for the processor's output register to indicate that the lamp under key button 2 should be illuminated at the flashing rate and the station's ringer should be turned on according to a specified ring rate indicative of the ringing condition. This portion of processor operation during which the station translation word is read and station activity and line activity are analyzed and information is obtained from the line package is called lamp-and-ring update.

Another example of processing that may be accomplished during lamp-and-ring update obtains when the information in the line activity word provided to the processor indicates that the line was being held by station 200 (or any other station having access to this line) but the information provided from the line package on the BUSY/IDLE lead indicates an idle line condition. Under these circumstances a hold abandoned condition exists and logic 7–4 changes the line activity word for the line from hold to idle. Thus, during lamp-and-ring update, the information in the line activity word may be changed depending upon the status information provided by the line package located via the translation mapping from the station translation word. Later on, during a subsequent interval called store update, the information in the line and station activity words will be updated dependent upon the conditions dictated by the state of the station set.

After the first line button information byte has successfully been transferred to the internal registers of the processor and the appropriate information generated to the processor's output register, the processor logic 7–6 causes the next line or service button information byte in the station translation word to be read. Appropriate lamp-and-ring information corresponding to the line or service assigned to the button is generated and stored in a processor output register in similar fashion.

After the last line button or service button information byte has been transferred to the processor and the processor has loaded the output register with the appropriate lamp-and-ring information bits, logic 7–6 enables logic 7–9 to shift the contents of the processor's output register out over the data send and data send bar leads, FIG. 2A, to the data transceiver at the station package, FIG. 2B. The processor uses the station equipment number from byte 4–1 to select and enable the station select lead of station package 216 corresponding to station set 200. Data transceiver 201 in the station package relays the lamp-and-ring information bits to the station set 200.

The first bit of data incoming to station set 200 causes station set 200 to return to transceiver 201 a bit of data reflecting its condition. As the successive bits of data are received by station set 200, the set provides logic 7–10 processor bits which indicate whether the station set desires dial tone recall, what the switchhook state of the station set is and which button, if any, of the station set has been depressed.

Processor 300 logic 7–10 receives the station set data applied over the data receive and data receive bar leads and stores the information in its internal processing registers. The information received in these registers is compared by logic 7–12 with the information stored in the station activity word (FIG. 5). If the comparison reveals that no changes have occurred and the station set is in the proper state (connected or not connected) the processor is instructed to read the translation word for the next station and the operations just described with respect to the translation word of FIG. 4 are repeated for the next station.

If logic 7–12 determines by comparing the information returned by station set 200 with the information stored in station activity word, FIG. 5, that changes have been made in the station set or that the station is not in the correct state, the station activity word is updated by logic 7–13 and/or a network function is performed. If any changes have been made such as the station user having depressed a line button, logic 7–13 updates the line activity word corresponding to the line button.

Figure 3:
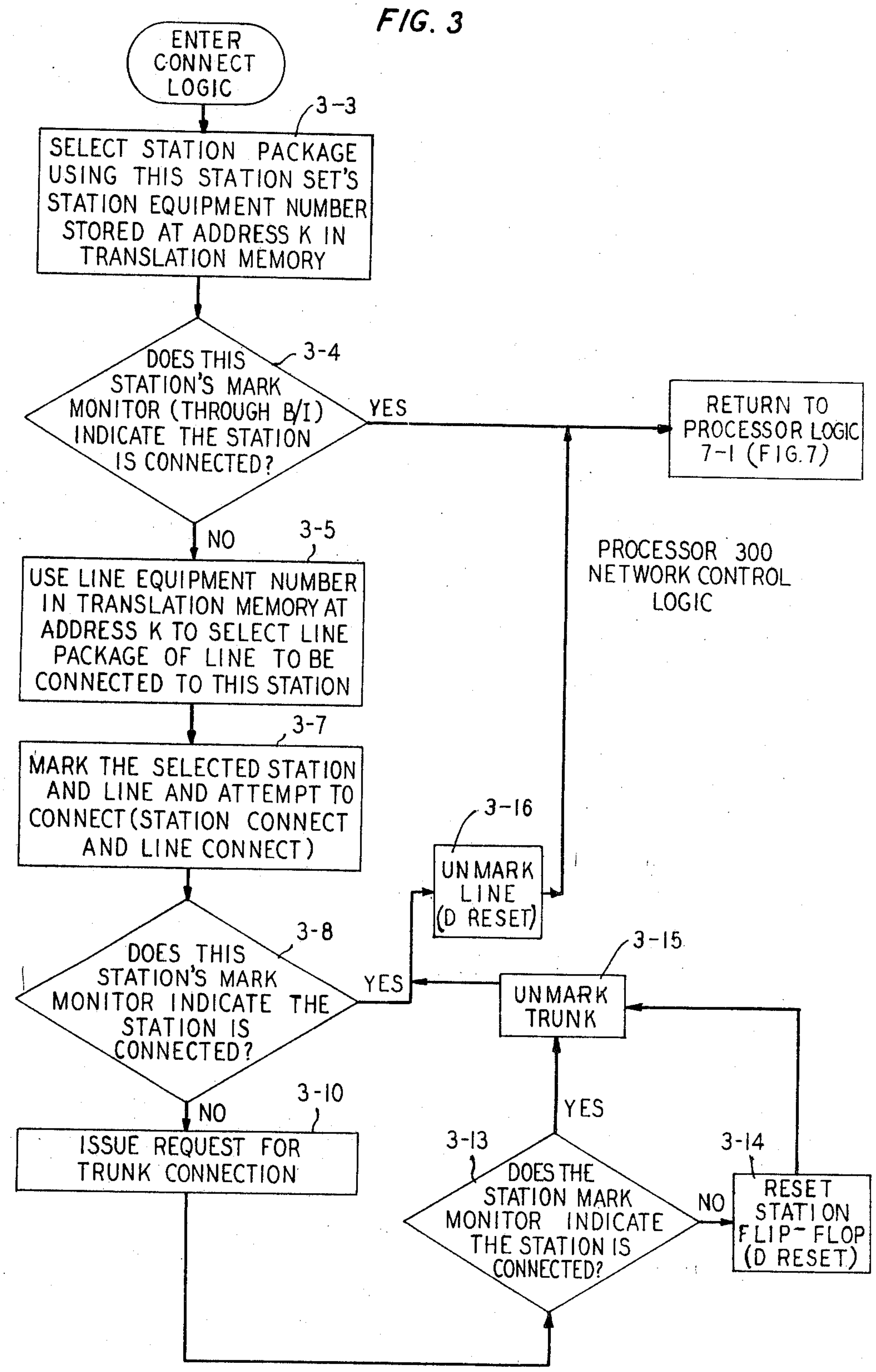
FIG. 3 shows the network control logic for the connection routine of the processor of FIG. 1.

If station 200 had previously been idle but now indicates that it is off-hook and has operated the key button corresponding to line L13, logic 7–13, after updating station and line activity words, FIGS. 5 and 6, respectively, activates logic 7–14 to energize the connect routine logic, FIG. 3. This logic controls the operation of the cross-points in network 11 to effect an interconnection of station 200 with line L13.

If on the other hand, logic 7–12 had determined that station 200 had priorly been connected to line L13 in the talking state, but what now station 200 is onhook with respect to line 13, logic 7–13 updates the station activity word, FIG. 5, for station 200 to reflect the onhook condition, and the station would be disconnected from line 13 by network control logic, FIG. 2A. However, the entire line activity word for line 13 cannot at this time be reset to indicate the onhook or idle condition because it cannot be ascertained from the information now in the processor whether line L13 may be connected to some other station.

SYSTEM CYCLE LOGIC—FIG. 8

In accordance with the present invention, the resetting of the line activity word 6–1 is governed by processor 300 in such a manner that the line activity word is reset only when all stations having access to that line have indicated that they are disconnected therefrom. For this purpose the primary line store word, FIG. 6, for each line contains a special line activity phase bit. The manner in which the phase bit is employed by the processor will now be described.

Figure 8:
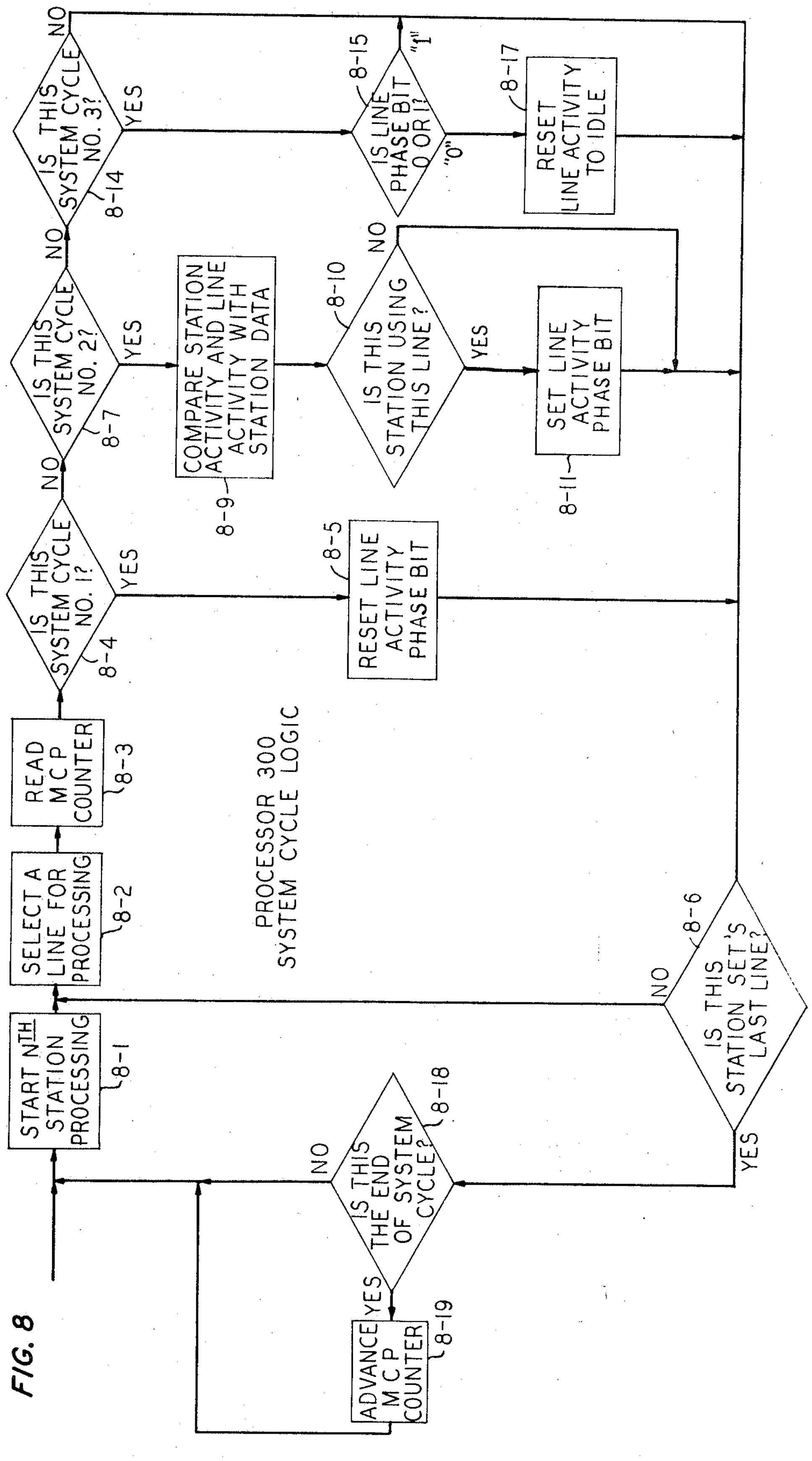
FIG. 8 shows the system cycle logic of the processor for clearing (i.e., resetting to idle) the line activity word in the primary line store (FIG. 6) in accordance with one specific illustrative embodiment of my invention.

The processor uses a two-stage counter (MCP), FIG. 8, to define three system phases: phase one, two and three. This phase counter is incremented each time the processor completes one processing cycle (i.e., each time all the stations have been processed). As lines are processed during phase one, their respective phase bits are reset by the processor 300 logic. At the end of this processing phase, the phase counter is advanced to phase two. During phase two all lines which have stations using them have their respective phase bits set. At the end of this phase the phase counter is again advanced. During phase three, and as all lines are processed, those which have their line activity phase bits reset will have their corresponding line activities cleared to idle. At the end of phase three the phase counter is reset to phase one and the process repeats.

With respect to a particular station and its lines, the processing technique is as follows. The processor accesses a station's translation word for the station in the manner previously described (see FIG. 4). Assuming the station contains all line buttons, the first line associated with the station is selected by logic 8–2 for processing. The state of the phase counter is then sensed. Assuming the counter state is phase one, the line activity phase bit for the selected line is reset by logic 8–5. Next logic 8–6 determines, for example, from logic 7–6 whether the line being processed is the last line in the station set's translation word. If the line being processed is not the station's last line, logic 8–6 causes logic 8–2 to select the next line in that station's translation word for processing. Accordingly, the significance of system phase 1 is to reset the line activity phase bit the first time a line is selected for processing so that the primary line store word will contain a logical "0" in phase bit 6–2. When all the lines for a station set have been processed once, logic 8–6 activates logic 8–18. Logic 8–18 determines whether the last station's translation word, FIG. 4, in memory has been accessed. If not, logic 8–18 activates logic 8–1 to access the next station's translation word. After all the station's translation words have been accessed one time, logic 8–18 determines when the last translation word (corresponding to the last station) in memory has been read and logic 8–18 activates logic 8–19 to advance the count in the phase counter (MCP) to 2. At this time, logic 8–1 is activated to access the first translation word, FIG. 4, in memory.

Assuming that the count accruing in the phase counter has been determined by logic 8–4 to indicate a count other than phase 1, logic 8–7 determines whether the count indicates the system is in phase 2. If the system is in phase 2, logic 8–7 instructs logic 8–9 to use the data in the station activity word, FIG. 5, to determine whether the station being processed by processing logic 8–1 is in fact using the line selected for processing by logic 8–2. If the line is in use by this station, logic 8–11 sets the line activity phase bit 6–2 to logical 1. Next logic 8–6 again checks whether the line being processed is the last line of the station. Assuming that it is not, logic 8–6 causes logic 8–2 to select another line for processing and operations proceed as previously described. Accordingly, during the second system phase, the line activity phase bit 6–2 is set to logical 1 if the line is in use by the station being processed.

If logic 8–6 determines that the line being processed is the last line in the station translation word, FIG. 4, for the station, it activates logic 8–18 to determine whether the translation word, FIG. 4, is the last translation word in memory. If it is not, logic 8–18 activates logic 8–1 to select the translation word for the next station. If logic 8–18 determines that the last translation word in memory has not been accessed for the second time, it activates logic 8–19 to increment the count in the phase counter to 3. Thereafter logic 8–1 is activated to once again access the first station's translation word in memory.

If logic 8–4 and logic 8–7 have determined that the system is neither in phase 1 or in phase 2 and logic 8–14 determines from phase counter (MCP) that the system is in phase 3, logic 8–15 reads phase bit 6–2. If the phase bit is logical 0, logic 8–15 activates logic 8–17 to reset the line activity word 6–1 to idle for the line being processed. The line activity word may properly be reset to 0 because during system phase 2 all of the stations at which this line appears had been accessed, and if any station had had this line in use, the phase bit 6–2 would have been set by logic 8–11. Since a phase bit which remains reset to 0 at the conclusion of the second system phase indicates a line that is not in use by any station, the remainder of the line activity word 6–1 may properly be reset to 0 by logic 8–17 during the third system phase. If, however, logic 8–15 determines that the phase bit is logical 1, it means that some station other than the station being processed was using that line during the preceding second system phase 1. Accordingly, logic 8–15 does not activate the reset logic 8–17 but instead activates logic 8–6. Logic 8–6 determines as before whether the line being processed is the last one for the station and operations similar to those described which take place dependent upon the decisions made by logic 8–6 occur again.

NETWORK CONNECTION CONTROL–FIG. 3

It will be recalled that processor 300 logic 7–14 passes control to the connect logic of FIG. 3 after logic 7–12 has compared station data with the station activity word to detect a station dictated change and logic 7–14 indicates that a line to station connection is required. As mentioned previously, the network control logic of FIG. 3 has been simplified, as described in the above-mentioned copending Fabiano et al. application, by omitting from processor 300 memory unit any need to store a network map listing which stations are connectable to which lines. The manner in which network control is exercised without need of network map will now be described in connection with the processor 300 network control logic for connections shown in FIG. 3 and the apparatus of FIGS. 1 and 2. In FIG. 3, logic 3—3 is called into operation by decision logic 7–14 when the time comes and the need arises to perform line to station connections. Decision logic 7–14 determines whether the station's translation word being accessed is involved in a station to line connection. If not, logic 7–14 returns control to logic 7–1.

Assuming that logic 7–14 determines that a station to line connection is required, logic 3—3 is activated to select the station package 216 STA.SEL. lead in FIGS. 1 and 2. The location of the STA.SEL. lead is identified to processor 300 by using the station's equipment number in byte 4–1 of the station's translation word. Next logic 3–4 ascertains whether the station is busy or idle by monitoring the state of station package 216's station B/I lead in FIGS. 1 and 2. If the station is busy, the connection has been made previously and logic 3–4 passes control back to logic 7–1. Assuming that the station B/I lead indicates that the station is not busy, logic 3–4 activates logic 3–5. Logic 3–5 uses the line equipment number for the line which has been indicated to the processor as requiring a connection to the station being processed, and accesses the line SEL lead for the line package 213 corresponding to this line in FIGS. 1 and 2. When logic 3–5 has accessed the line SEL lead, logic 3–7 activates the line connect lead for the accessed line package.

It should be noted that contrary to other telephone systems having a central switching network, it is desired to permit a station user to obtain access to a "busy" line, rather than to prevent such access. This arises because of the close community of interest existing among key telephone station users who, more often than other telephone customers, have need to bridge onto existing connections. Accordingly, it is not necessary for processor 300 to sample the state of line package 213's busy/idle lead at this time. Energization of the line connect lead of line package 213 during the interval that the line select lead is activated enables AND-gate 220 which sets connect flip-flop C 221 and also sets D flip-flop 222. D flip-flop 222 in the set condition applies a signal to lead LD-13 associated with a row of gate electrodes of cross-point switching devices in switching array 11. The potential on lead LD-13 enables the gates in the row which gates include the gate electrode of cross-point 1,316.

Simultaneously, logic 3–7 energizes the STA.SEL. and Station Connect leads to station package 216. These energized leads enable AND-gate 207 which in turn sets station mark SM flip-flop 240. The "1" output of the SM flip-flop 240 turns on transistor Q1 in mark monitor circuit 210. Transistor Q1 in the on condition provides, through its emitter-collector path a current sink for the column of cross-points in cross-point array 11 associated with column conductor N16 that is assigned to station package 216.

The manner in which transistor Q1 operates now will be explained in detail. Transistor Q1 when initially turned on goes into saturation since the positive potential provided by the "1" output of station mark SM flip-flop 240 together with the high-impedance source 241 provide very little emitter current through Q1. With Q1 saturated the potential of its collector is only slightly above ground potential and Q1 provides a low-impedance ground to conductor N16. The low-impedance ground on conductor N16 together with the positive pulse applied on lead LD-13 by the D flip-flop of the line circuit 213 allows the cross-point 1,316 to fire. After the cross-point fires, however, the potential of lead N16 approaches that of positive bias circuit 223. The higher potential now appearing on lead N16 combined with the fixed bias provided at the base of transistor Q1 by the "1" output of SM flip-flop 240 causes transistor Q1 to enter its constant current zone of operation. Transistor Q1 operating in its constant current mode presents a high impedance to conductor N16. Accordingly, any changes in the potential of lead N16 will not affect the current into transistor Q1. Accordingly, the audio current in conductor N16 will not be attenuated by any shunt path through Q1 so long as Q1 is maintained in its constant current mode.

When station set 200 associated with station package 216 is in the off-hook condition, audio signals passing through the cross-point are provided with a continuous path which may be traced from conductor N16, through the right-hand winding of transformer T2, lead ST, the off-hook station set 200, lead SR, the left-hand winding of transformer T2 and the emitter collector path of transistor Q3 to ground. Transistor Q3 will have been put in the conducting state by the set condition of station mark SM flip-flop 240.

With the cross-point 1,316 enabled at its gate electrode and provided with a positive bias at one of its input terminals by positive bias circuit 223 in line package 213, a talking path is provided from line transformer T1 in the line package to the station transformer T2 in station package 216. The station user at station set 200 may then converse with the party connected at the tip and ring conductors.

Assuming that cross-point 13 has been fired, the increased potential on lead N16 which gives rise to the constant current mode of operation of transistor Q1 will cause sufficient voltage drop across resistor 242 to turn on transistor Q2. Transistor Q2 in the on condition lowers the potential on mark monitor lead MM. The lower potential on mark monitor lead MM will prevent AND-gate 211 from being enabled when the D-reset lead is activated by processor 300 at the end of each station scan. The nonactivation of gate 211 will prevent the station mark SM flip-flop 240 from being reset and so its "1" output will remain high. The high signal at the "1" output enables gate 206, maintains Q1 on and maintains transistor Q3 on by back biasing diode D1. When processor 300 next enables the STA.SEL. lead, the output on the station B/I lead at the output of enabled gate 206 will indicate to the processor that a connection path has been established for station package 216 through network 11.

If, however, for any reason whatever, it had not been possible to establish a network path for station package 216, transistor Q2 in mark monitor circuit 210 would not be turned on. D-reset gate 211 would therefore not be inhibited and, when processor 300 next applied a D-reset signal to the D-reset lead, station mark SM flip-flop 240 would be reset. With flip-flop 240 reset, B/I gate 206 would not be enabled and processor 300 would not receive a signal on the station B/I lead representing the successful establishment of a network path.

If the signal on the station B/I lead indicates that a network connection has been established, logic 3–8 activates logic 3–16 to remove the line connect signal from the line connect lead to line package 213. Processor 300 subsequently energizes the D-reset lead to reset D flip-flop 222. However, cross-point 1,316 continues to remain energized so long as the station is "off-hook" with respect to the line. At this time, logic 3–16 activates logic 7–1 to continue the remaining processing routines.

If processor 300 does not receive a signal indicating a successful network connection on the station B/I lead after the processor had marked the line and station connect leads, logic 3–8 enables logic 3–10. Logic 3–10 applies a signal to the trunk request lead FIG. 1 to trunk control circuit 31. Trunk control circuit 31 may advantageously comprise a plurality of gates and flip-flops arranged in a sequential walking circuit configuration which applies an activating output signal on a successive one of leads TRK.1 SEL. through TRK.K SEL. each time the processor applies a signal to the trunk request lead. Logic 3–10 is provided, in accordance with the principles described in the copending application of L. P. Fabiano, Jr. et al., Ser. No. 35,434, filed of even date herewith, to initiate a request to the trunk control circuit 31 of FIG. 1 so that an idle one of trunk paths 25, 26, or 27 may be selected to complete the previously attempted connection. The signal applied on the particular TRK.1 SEL. through TRK.k SEL. output lead of trunk control circuit 31 enables a corresponding one of trunk packages 1 through K.

When one of these trunk packages is selected and is in the idle condition, it applies a cross-point gating signal to its TD-lead to energize a row of cross-point gate electrodes. For example, if trunk package 2 is selected by trunk control 31 and trunk package 2 is idle, a cross-point gate enabling pulse will be applied to lead TD-2.

When the processor issues the trunk request to trunk control 31, the line package and station package between which connections are desired to be established will have been marked by logic 3–7 as previously described. This marked condition will obtain until a D-reset signal is generated by processor 300 at the end of the time allowed for the connection attempt. If the connection was successful, logic 3–15 and 3–16 are activated and unmark the line and trunk D-leads. If unsuccessful, logic 3–14 indicates the resetting of the station flip-flop 240 by the D-reset signal and a high MM lead, and logic 3–15 and 3–16 reset the mark conditions so that the next time this station is processed a new connection attempt will be made with a new trunk selected by logic 3–1.

Let it be assumed, for example, that the processor had previously been unable to effect a connection between line package 1 and station package *m* for which no direct cross-point is provided in network 11, FIG. 1. Let it be further assumed that trunk package 2 will be selected by trunk control 31 and that line package 1 and station package *m* are again marked by the processor. The marking of line package 1 by the processor causes a cross-point gate enabling pulse to be applied to lead LD-13. The selection of trunk package 2, assuming this trunk package to be at idle condition, causes a cross-point gate enabling pulse to be applied to lead TD-2. Accordingly, cross-points 26–1 and 26–4 have enabling pulses applied to their gate electrodes. The selection of station package *m* by the processor provides a ground path to lead N20 to fire cross-points 26–1 and 26–4 in series in similar fashion to the manner in which the single cross-point 1,316 was fired in the above-described connection between line package 213 and station package 216. When cross-points 26–1 and 26–4 are operated, station package *m* will return a signal on the station B/I, *m* lead to processor 300 informing the processor of the successful network connection.

If, however, trunk control 31 had selected a trunk package which was in use on another network connection its B/I detector circuit would have responded to the potential on its respective one of leads 25, 26, or 27 and prevent the selected trunk package from applying a cross-point gate enabling pulse to its respective TD-lead. Under these circumstances, the station package that was marked would not return a busy (i.e., connected) signal on its station B/I-lead to processor 300 and processor logic 3–13 would detect this fact and logic 3–14 would unmark the station. Another attempt to connect the station would be made the next time it is processed.

CONCLUSION

Figure 7:
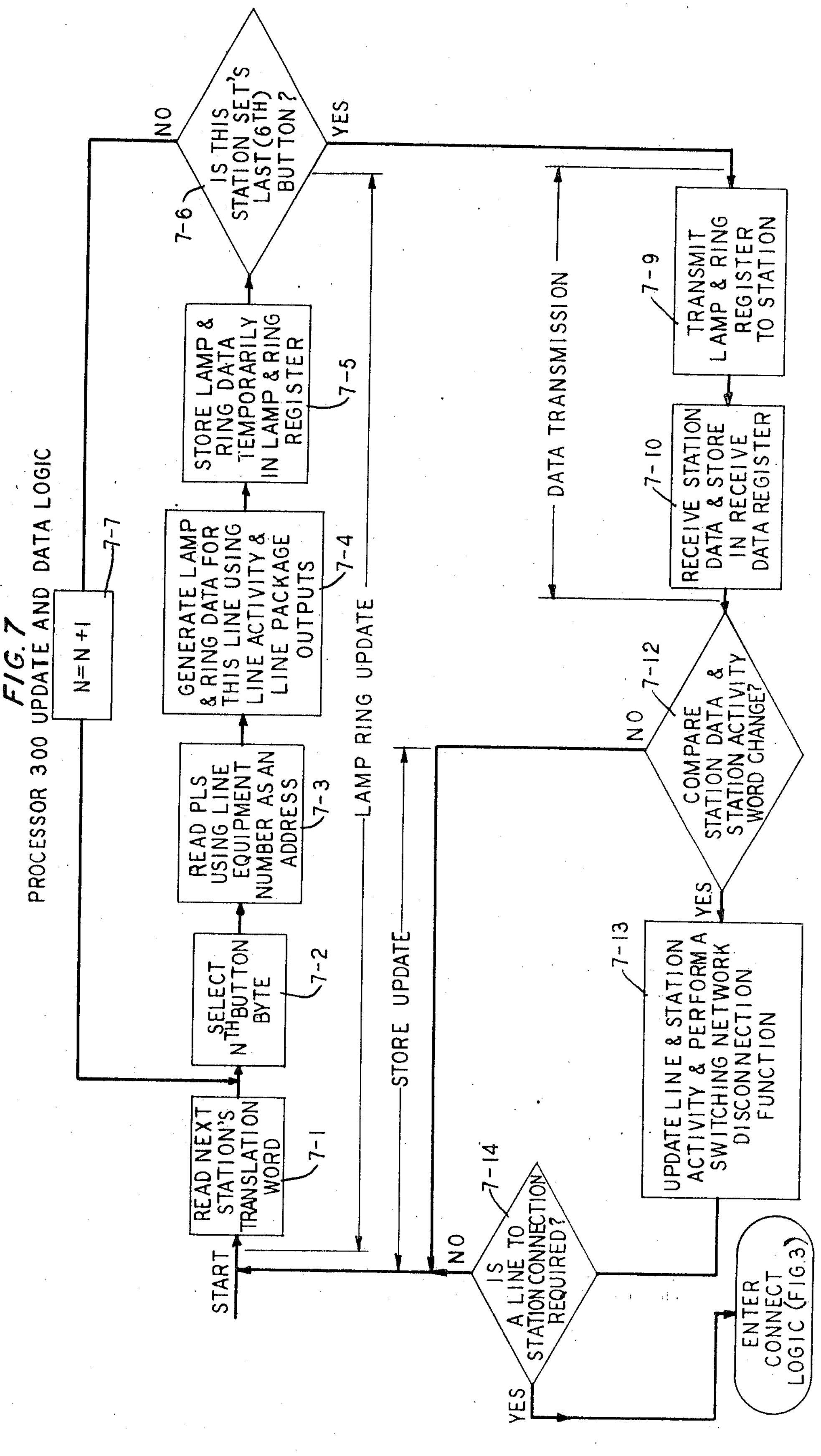
FIG. 7 shows the lamp and ring update, the data transmission, and the store update logic of the processor.

Thus, in accordance with the present invention the primary line store has been accessed during three separate memory access phases. During a first of these phases a phase bit in each line activity word is reset. During the second of these phases, the line activity word for each line is updated and the phase bit is set for each line each time a station translation word for a station having access to this line is accessed and the station indicates that it is using the line. If the station indicates it is not using the line, the line activity word is not updated and the phase bit is allowed to remain reset. During the third phase of system cycle operation, each line activity word associated with a reset phase bit is reset to indicate idle line activity. In this manner each line would only have one activity line word in memory and the plurality of stations may access a given line without causing any confusing redundancy in the manner in which line activity information is stored in memory. Also, it will be apparent that processor 300 system cycle logic of FIG. 8, the network control logic of FIG. 3 and the update and transmission logic of FIG. 7 may be implemented either through the use of wired logic or stored program controlled devices as may be convenient under the circumstances. It will be apparent to those skilled in the art that variations in the above system may be devised without departing from the spirit and scope of the invention herein set forth.

What is claimed is:

1. An electronic key telephone system having a plurality of station circuits and a plurality of line circuits accessible to said station circuits comprising:
   - means for sequentially accessing said circuits to ascertain their respective activity states;
   - memory means having an activity word respective to each of said circuits for storing an indication of the idle or active states thereof and a normally reset phase bit associated with said activity word;
   - means for updating the activity word for one of said line circuits when said accessing indicates an active line state;
   - means for setting said phase bit for said last-mentioned activity word when said accessing indicates the active state for said line corresponding thereto; and
   - means, controlled by said phase bit in the reset state and operative after all of said plurality of circuits have been accessed, for updating said activity word associated with said reset phase bit to indicate the idle state of said corresponding line.

2. An electronic key telephone system according to claim 1 wherein said memory means includes a translation word for each of said station circuits and wherein said means for sequentially accessing said circuits sequentially accesses each said translation word.

3. An electronic key telephone system according to claim 2 wherein each said translation word includes a plurality of bytes, there being one byte identifying the equipment location of said station circuit and one byte for identifying the equipment location of each line circuit accessible to said station circuit.

4. An electronic key telephone system according to claim 3 wherein said first-mentioned means for updating includes means for comparing the activity state ascertained by said means for sequentially accessing said circuits with said activity state indicated in said activity word in said memory means.

5. An electronic key telephone system according to claim 4 wherein each said activity word is stored in memory at an address corresponding to an equipment location and wherein said first-mentioned means for updating employs said equipment location to access said activity word.

6. An electronic key telephone system having a plurality of station circuits and a plurality of line circuits accessible to said station circuits, certain of said line circuits being accessible to more than one of said station circuits comprising:
   - a switching network in which each of said line and station circuits is given an appearance,
   - a central processor including a memory unit having a translation word for each of said stations, and an activity word respective to each said line,
   - said translation word including a byte for identifying each line accessible to said station,
   - means controlled by said processor for ascertaining whether any of said stations is using a particular one of said lines to which it has access,
   - first means controlled by said ascertaining means for updating said respective activity word, when said station is using one of its accessible lines and
   - second means controlled by said ascertaining means indicating said station is not using one of its lines for updating the activity word respective to said line only after all other stations having access to said line have indicated to said ascertaining means that said line is idle.

7. An electronic key telephone system having a plurality of station circuits and a plurality of line circuits accessible to said station circuits, comprising means for sequentially accessing said circuits, memory means for storing an activity word indicating the idle or active states of a respective one of said line circuits and for storing a phase bit for said activity word, means for initially setting the phase bit of each of said memory words to a predetermined state, means for receiving control data from said station circuits, means controlled by said receiving means for updating said line activity word and setting the respective phase bit to a state opposite said predetermined state when said control data indicates an active line state, and means controlled by said phase bit remaining in said predetermined state and operative after all of said circuits have been accessed by said accessing means for resetting said line activity word to indicate the idle state of the respective one of said line circuits.

8. An electronic key telephone system having a plurality of station circuits and a plurality of line circuits accessible to said station circuits, certain of said line circuits being accessible to more than one of said station circuits, comprising:

memory means for storing a translation word for each of said stations, said word containing a byte for identifying each line accessible to said station, an activity word in said memory means for each said line, a phase bit respective to each said activity word, an activity word in said memory means for each said station, means for sequentially accessing each of said translation words and station activity words, means operative when one of said translation words is accessed for sequentially employing each said byte therein to access a corresponding line activity word, means operative during a first sequential accessing of each of said translation words for resetting said phase bit respective to each said activity word, means operative during a second sequential accessing of each of said translation words for setting the phase bit respective to each said activity word associated with a line in use by said station corresponding to said accessed translation word, and means operative during a third sequential accessing of each of said translation words for resetting each activity word having a respective phase bit remaining in the reset condition.

9. A method of operating an electronic key telephone system having a processor, a plurality of station circuits and line circuits accessible to said station circuits, a memory for storing activity words indicating the activity states of associated ones of said circuits and for storing a plurality of translation words, and means including said translation words for accessing said circuits and said activity words, comprising operating said processor to:

reset one bit of the activity word associated with each of said line circuits during a first phase of processor operation;

update during a second phase of processor operation each activity word including said one bit thereof corresponding to a line circuit found by said accessing of said translation words to be in use by one of said station circuits; and reset during a third phase of processor operation the remaining bits of each activity word still having said one bit reset.

10. In an electronically controlled system having a first and second plurality of interconnectable circuits, certain of said first plurality of circuits being simultaneously connectable to more than one of the circuits of said second plurality of circuits, and a stored program data processing unit including a memory having a respective word for storing an indication of the busy or idle condition of an associated one of said circuits, the method of controlling the updating of said memory unit words comprising:

initially storing in a predetermined bit position of the memory word respective to each of said first plurality of circuits a particular binary bit value;

changing the value of said predetermined bit for each said memory word associated with a circuit of said first plurality which is interconnected with any circuit of said second plurality of circuits; and, thereafter, storing an idle indication in each memory word not having said particular binary value stored in said predetermined bit position.

* * * * *